United States Patent [19]

Evers

[11] 3,862,374

[45] Jan. 21, 1975

[54] CALLING STATION IDENTIFIER-SENDER

[75] Inventor: Harry G. Evers, Genoa, Ill.

[73] Assignee: Antel Corporation, Arlington Heights, Ill.

[22] Filed: Jan. 21, 1974

[21] Appl. No.: 435,342

[52] U.S. Cl. .......... 179/18 FH
[51] Int. Cl. .......... H04q 3/72
[58] Field of Search ....... 179/18 FH, 18 GE, 18 GF, 179/17 A, 7 MM, 7.1 R, 7.1 TP

[56] References Cited

UNITED STATES PATENTS 3,787,632 1/1974 Male et al. .......... 179/18 FH

*Primary Examiner*—Thomas A. Robinson

[57] ABSTRACT

An identifier-sender for the incorporation of Automatic Number Identification (ANI) in a telephone or other communication system, including a transmitter, comprising an encoding matrix, capable of simultaneously generating a plurality of sets of calling-station identification signals in response to actuating signals received over conductors constituting parts of the data transmission and control paths of the system, and an interrupter for opening the involved data paths during operation of the transmitter; the sets of identification signals are developed in a clock-controlled fixed time sequence.

9 Claims, 10 Drawing Figures

CALLING STATION IDENTIFIER-SENDER

BACKGROUND OF THE INVENTION

Equipment for the addition of Automatic Number Identification (ANI) capability to existing telephone systems, as presently known, is capable of identifying only one call at a time. This is entirely appropriate where the only need for number identification is for actuation of call-recording equipment located within the system where the call originated; such recorders, for economic reasons, are usually provided in such small quantities that a greater capability for simultaneous call identification would be superfluous.

The principle generally followed, therefore, provides for a signal to be applied from a trunk or junctor circuit that has been selected in the process of completing a call and which represents a more or less common channel or path over which a call requiring call number identification might be expected to be routed. An outgoing (DDD) trunk to a toll center is an example of such a trunk. In some cases, the signal thus applied consists of a positive DC potential on the Sleeve (S) or Control (C) lead in those systems that provide a continuous path on this lead from the line circuit to the trunk. In other cases where a continuous sleeve or control lead does not exist, the signal may be transmitted to the line circuit from the trunk over the speech pair (i.e., the Tip (T) and Ring (R) leads).

There are other systems in which the signal applied at the trunk or junctor circuit is in AC tone signal supplied to the sleeve or control lead. The tone signal is conducted to the line circuit, where it is detected. From the line circuits, individual wires are connected to a shared matrix consisting of neon lamps, resistors, or coils inductively coupled to the individual conductors emanating from each line circuit to be provided with ANI. Because the matrix is common and capable of providing only one number identification at a time, the feature must be arranged so that only one trunk circuit at a time may transmit a signal to an originating line circuit and so that trunks may be prevented from attempting an identification until any identification in progress has been completed.

As mentioned above, this arrangement is quite satisfactory where the calling number that has been identified will only be recorded locally for billing purposes. But if the calling number is to be sent to a distant toll center for recording or is to be used for other purposes, the one-at-a-time, common identifier is less than ideal. Among its shortcomings are the fact that the calling number must be loaded into a sender, which must in turn be connected temporarily with an outgoing trunk, usually the same trunk that signalled the line circuit to request identification in the first place. Loading the sender and associating it temporarily with a trunk circuit is a complex and costly operation and does not allow much flexibility in the kinds or numbers of trunks that can be associated with the sender. First, the means for connecting trunks to a sender entails a connecting arrangement for a fixed maximum number of trunk circuits. Second, demands for number identification that arrive nearly simultaneously must not exceed a certain number; hence, the total number of trunks that can be served with number identification privileges is strictly limited.

In a variation of the aforementioned ANI arrangement, used by some manufacturers to avoid the problems created by having only one sender that responds when a one-at-a-time identification is made, the calling numbers are loaded into the outgoing trunks where they are stored and sent to the ticketing office by multifrequency pulsing. This technique speeds up the process, because more or less simultaneous sending can proceed even though each identification must still take place individually. Although it reduces the magnitude of the delays encountered with the previously described arrangement, the provision of storage and sending capability in each outgoing trunk results in a much higher cost.

Thus, wherever it is necessary or desirable to identify a calling number and to send that number out of a central office, economic and practical limitations are imposed by the number of identifications and transmissions that can be handled at the same time. The possibility of broadening the uses to which calling number identification can be put has consequently been limited by the methods of operation intrinsic to current ANI equipment. Extension of these techniques to overcome the traffic limitations, though possible, results in expenses that are not easily borne by the value of the additional services.

SUMMARY OF THE INVENTION

The system comprising the present invention effectively overcomes the disadvantages of existing arrangments by utilizing a concept that combines identification and sending. The usual sender which must be loaded with the calling number is eliminated, as is the connecting means for associating the sender with an outgoing trunk. In addition, the number of simultaneous identifications that can be made and transmitted to a distant recorder is not limited by the identification principle.

A unique feature of the invention lies in the combinational nature of the identifier and sender employed in the system and the fact that the tone sequence which denotes the calling line is sent forward from the line circuit to the trunk or junctor circuit via a switched conductor that serves both as a transmission path and as the path over which the identifier-sender is caused to connect itself to the line circuit conductor by the trunk or junctor requesting a number identification.

According to the system disclosed here, signals denoting decimal digits as well as control signals for properly interpreting the beginning and the end of an ANI transmission at the distant end are more or less continuously generated by a common source and distributed in correct combinations and sequences to the various line circuits of a switching system. A terminal representing the number of a calling station to be identified is coupled through a matrix of gates to the output terminals of a sequence circuit. The terminal representing the calling number is also connected to the sleeve or to the tip or ring conductor of the line circuit which it is supposed to represent. The signals denoting decimal digits of the calling number are conveyed, via one of these conductors, through the switching system to an outgoing trunk circuit where the signals are conditioned and applied to the transmission path to the distant office.

Switches are provided to isolate the tone transmission conductors from the matrix until they are closed. They further serve to combine the digits which make up the calling number. The switches are actuated only when instructed to do so by a trunk to which the associated line circuit is connected. Thus, only those lines requested by a trunk to furnish calling number identification will do so. After the calling number has been sent the switches associated with the calling number terminal are turned off.

In the example used to illustrate the invention, and described hereinafter in detail, the signals used to transmit digits of the calling number comprise frequencies in the so-called two-out-of-six Multiple Frequency (MF) pulsing scheme used for intertoll signalling purposes; however, frequencies of the dual-tone multifrequency series, digitally encoded signals, or dial pulses would serve the purpose as well. As illustrated, each digit is represented by a unique combination of two frequencies; each calling line is represented by seven digits (office code and station number) which, according to the standard intertoll pulsing scheme, are preceded by a Key Pulse (KP) signal and an information digit and are followed by a Stop Transmission (ST) signal. These special signals are each also composed of a unique combination of two frequencies and signify the beginning and end, respectively, of a standard ANI transmission. Between the KP signal and the first digit of the area code is an information digit or Identifier signal (I) consisting of a regular MF frequency combination and having a value of zero to nine.

A total of 10 digits are sent, in the signalling scheme used for illustrative purposes these digits are: KP+I+Office Code (three digits) + Station Number (four digits) +ST. The KP and $S_t$ digits are always the same. Moreover, the I digit is also always the same for ANI stations, signifying that the call has been automatically identified and that no failure has occured, but is different for operator-identified numbers. Since identification and sending are combined in one function, there can be no separate identification failure. Similarly, the OC office code will usually be the same for all numbers identified within a given system. However, because these office codes may vary among systems, provision is made for strapping in the particular digits required for this code at the central office. The digits of the station number must be different for each calling station and therefore are furnished in as many combinations as necessary to serve the size of the switching system up to a maximum of ten thousand numbers, but combined in each case with the other uniform digits (KP, I, OC and ST) and represented by a calling number terminal for each calling number equipped for ANI operation.

Accordingly, the invention relates to a telephone system or like communication system of the kind comprising a plurality of calling stations each connectable to a plurality of called stations through a series of trunk circuits each including a data path and a control path, and more specifically to a combined calling number identifier and sender capable of simultaneous identification of a multiplicity of calling station numbers and able to send the identity of those numbers out over a plurality of trunks making concurrent requests. The identifier-sender comprises signal-actuated identity transmitting means for transmitting the identity of a calling station, as a sequence of signals, through a first switched conductor incorporated in a path from a line circuit to an outgoing trunk extending to a called station. Actuating means are provided for applying an actuating signal from the trunk to the transmitting means, over a switched conductor, requesting identification of the calling number. Further, the identifier-sender includes means for effectively disconnecting the data path between the calling station and the transmitting means, during intervals of operation of the transmitting means, to preclude data transmission during such intervals.

DESCRIPTION OF THE PREFERRED EMBODIMENTS

Figure 1:
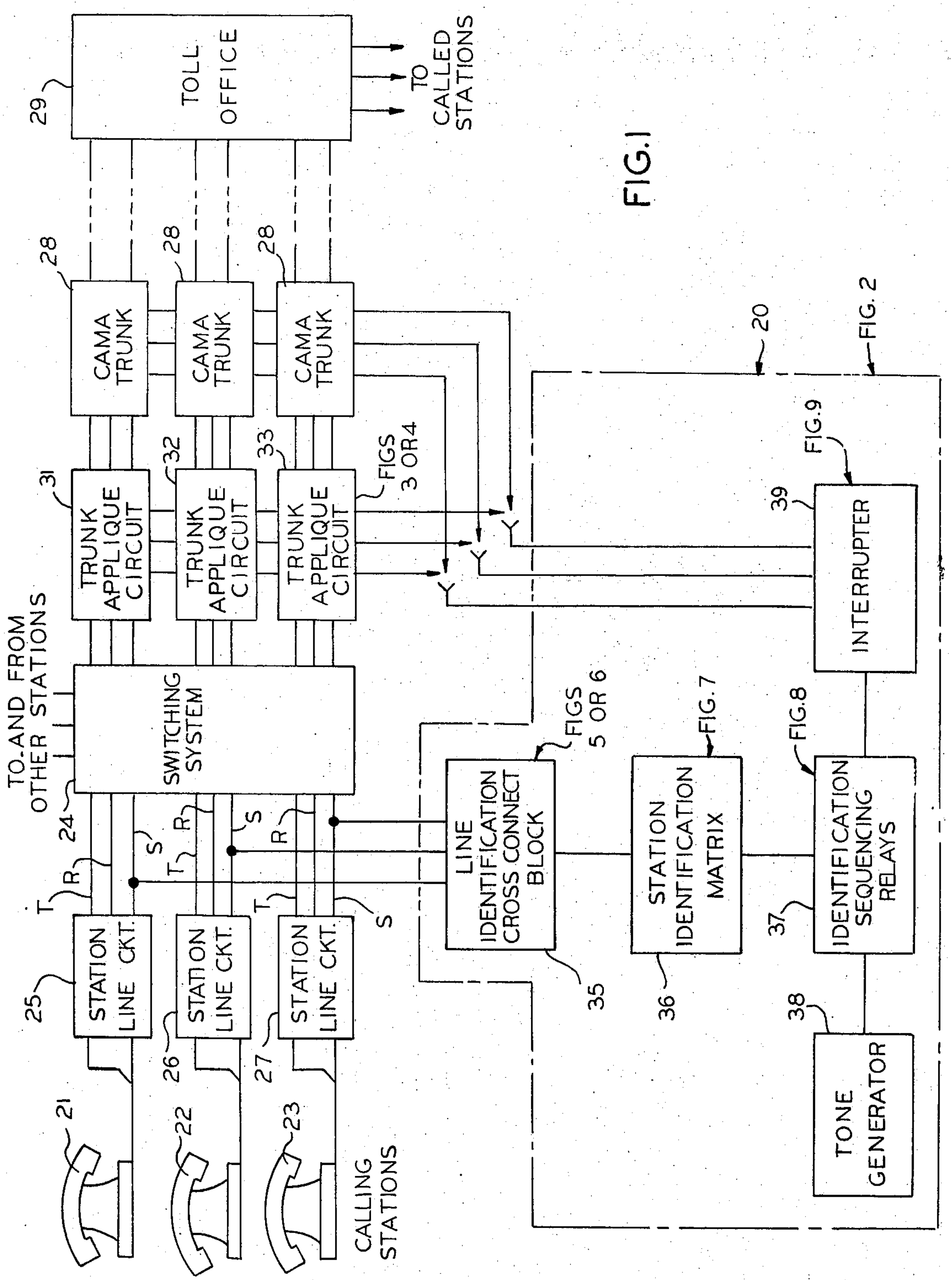
FIG. 1 is a block diagram of a telephone system incorporating a combined calling number identifier and sender constructed in accordance with one embodiment of the invention.

FIG. 1 affords a block diagram of a telephone system in which a combined calling number identifier and sender 20, constructed in accordance with one embodiment of the present invention, is incorporated. The telephone system includes a series of telephone stations generally represented by the stations 21, 22 and 23, any one of which may constitute a calling station that may initiate operation of the identifier-sender 20. The telephone station 21 is connected to a switching system 24 through a conventional station line circuit 25. Similarly, the telephone stations 22 and 23 are coupled to the switching system 24 by individual line circuits 26 and 27. The switching system 24 may be coupled to a plurality of other stations (not shown) in the same manner.

The switching system 24 is connected to a series of CAMA trunk circuits 28, which may be of conventional construction. The CAMA trunks are connected to a toll office 29 which is also connectable to any one of the "called" stations (not illustrated) that can be reached trough the telephone system.

The identifier-sender 20, in the form illustrated in FIG. 1, utilizes a trunk applique circuit 31 that is connected in one of the trunks 28 following the switching system 24. In a similar manner, additional trunk applique circuits 32 and 33 are shown as interposed in the trunks 28 from the switching system 24 to the toll office 29. Each of the calling stations is coupled to a line identification cross-connect block 35 which is in turn connected to a station identification matrix 36. The identification matrix 36 is actuated by an identification sequencing relay unit 37, to which a tone generator unit 38 is coupled. In the illustrated system, the tone generators incorporated in the unit 38 develop frequencies in the two-of-six Multiple Frequency (MF) pulsing scheme for intertoll signalling purposes. However, as mentioned above, other signals capable of identifying a calling station can be utilized in device 20, with a consequent substitution of appropriate signal sources in the tone generator unit 38.

The identification sequencing relay unit 37 is also coupled to an interrupter 39. The interrupter 39 is further coupled to the CAMA trunks 28 or to the trunk applique circuits 31–33.

In operation of the combined identification and sending device 20 of FIG. 1, when a call is initiated from one of the calling stations such as the station 21, and station identification is required, the interrupter 39 is actuated by a signal from the CAMA trunk 28, which may be supplied directly from a convention CAMA trunk or through an applique circuit such as the circuit 31. The interrupter 39, in turn, actuates the identification sequencing relay unit 37 to transmit a series of tone signals (supplied from the tone generator 38) to the identification matrix 36. These tone signals are applied to the line circuit for the calling station 21 through the line identification cross-connect block 35. For the illustrated system, as described in greater detail hereinafter, the signals supplied to the line circuit for station 21 usually include a total of 10 different signals, fully identifying the calling station and affording the necessary identification information to be recorded in the toll office 29. Transmission may be made over any of the three conductors normally constituting intraoffice trunking for the calling station; that is, the identification information may be transmitted over the sleeve or control conductor S (called the C conductor in some systems), over the tip conductor T, or over the ring conductor R, depending upon the particular construction adopted for the trunk applique circuit.

Figure 2:
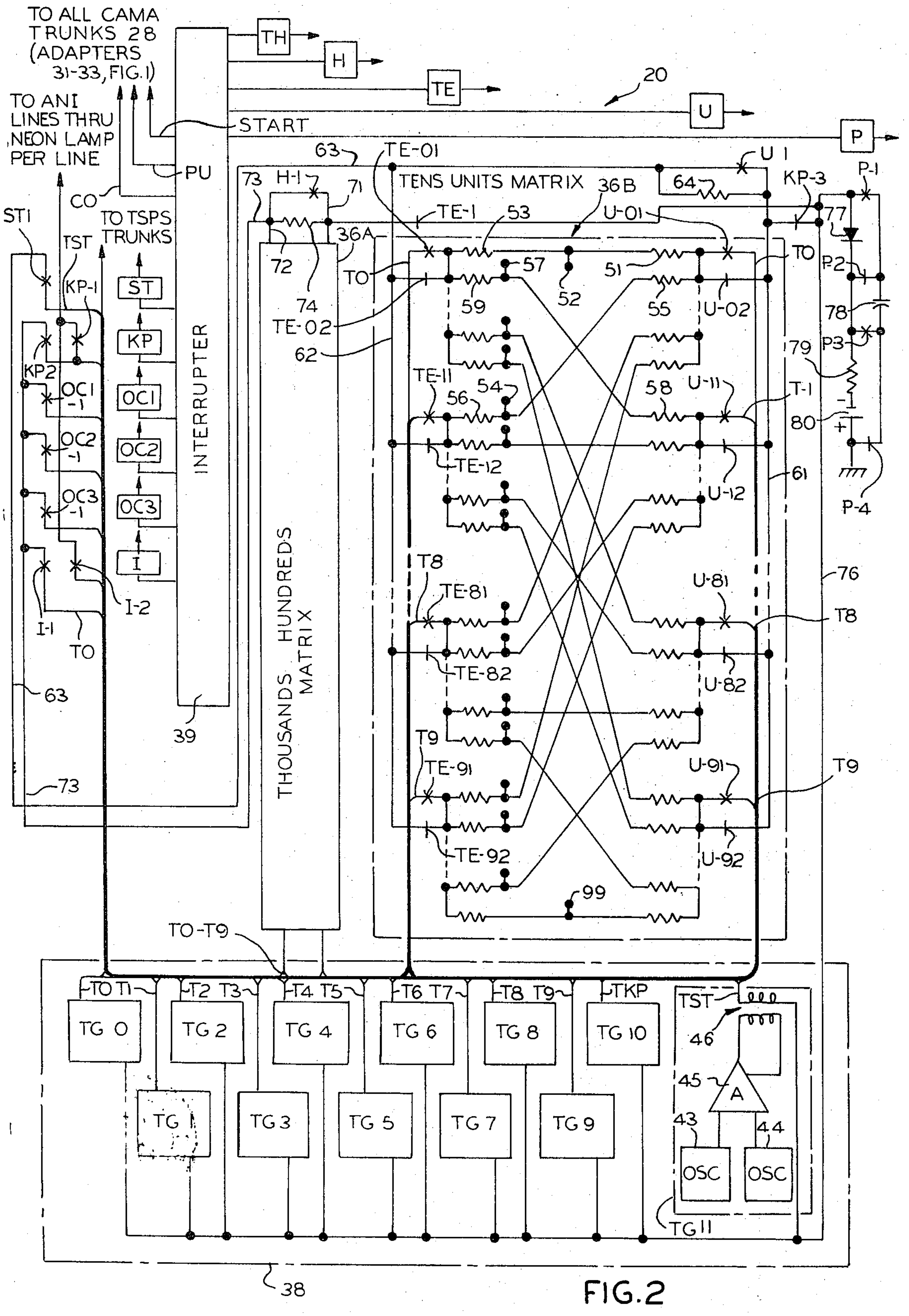
FIG. 2 is a simplified schematic diagram, partly in block form, of the principle components of the calling number identifier and sender of FIG. 1.

To afford a more complete understanding of the invention, reference may be made to the more detailed illustrations comprising FIGS. 2 through 10. As shown in FIG. 2, which comprises a more detailed but still rather simplified illustration of the identifier-sender 20, the tone generator unit 38 includes a total of 12 individual dual-tone generators TG0 through TG11. The tone generator TG11 is typical in construction and comprises two oscillators 43 and 44 coupled through an amplifier 45 to the primary winding of a tone transformer 46. The other tone generators TG0 through TG10 are all of similar constuction, the only difference being the operating frequencies of the indivdual oscillators in the tone generators. The tone generators may be of conventional construction, so that a more detailed illustration is deemed unnecessary.

The secondary of the tone transformer 46 is connected to a conductor TST that affords an output circuit for the tone generator TG11. The output of the tone generator TG10 comprises the conductor TKP. The outputs of the tone generators TG0 through TG9 comprise the conductors T0 through T9.

In FIG. 2, the station identification matrix 36 is shown as comprising two matrix units 36A and 36B. The unit 36A constitutes a matrix for the "thousands" and "hundreds" portions of a four digit station identification number as well as a transmission path for the KP, I, and OC digits. The unit 36B constitutes a "tens" and "units" matrix and also covers a stop (ST) digit. The tens-units matrix 36B is shown in some detail in FIG. 2 and is illustrated even more completely in FIG. 7.

The operation of the identification matrix 36B for tens and units digits is basically controlled by a "tens" relay TE and a "units" relay U. The tens relay TE has its operating coil connected to the system power supply and to the interrupter 39; similarly, the units relay U is energized through a circuit completed through the interrupter. The units relay U includes a series of normally open contacts U-01 through U-91 which are individually connected to the tone generator outputs T0 through T9, respectively. Similarly, the tens relay TE includes a series of normally open contacts TE-01 through TE-91 that are individually connected to the tone generator outputs T0 through T9, respectively.

The units relay contacts U-01 are connected to a resistor 51 that is connected to an output terminal 52 indicative of a tens-units value of zero for both digits. Similarly, the relay contacts TE-01 are connected to a corresponding resistor 53 that is in turn connected to the terminal 52. The units relay contacts U-01 are also connected to a resistor 55 connected to a terminal 54. A further connection is made from the relay contacts TE-11 to a resistor 56 that is also connected to the terminal 54, the terminal 54 affording an output signal indicative of a one in the "tens" column and zero in the "units" column of a station identification number. In the same manner, the relay contacts U-11 and TE-01 are connected to an output terminal 57 through the resistors 58 and 59, respectively. The matrix output terminal 57 affords an output signal indicative of a "tens" value of zero and a "units" value of one.

This connection pattern is continued throughout the tens-units matrix unit 36B and a corresponding connection arrangement is employed for the thousands and hundreds matrix unit 36A, the latter being actuated by a "thousands" relay TH and a "hundreds" relay H.

The units relay U also includes a series of normally closed contacts U-02 through U-92. The U-02 contacts are interposed in a circuit between a conductor 61 and all of the resistors (e.g. resistors 51, 55, et seq.) of the matrix that are connected to the relay contacts U-01. In a similar manner, the normally closed contacts U-12 are connected in a circuit from the conductor 61 to all of the resistors in the matrix that are connected to the relay contacts U-11. The "tens" relay TE has a series of similar normally closed contacts TE-02 through TE-92 connected from a conductor 62, in a similar pattern, to the matrix resistors for the tens digits. Again, a corresponding pattern of connections would be employed in the thousands-hundreds matrix unit 36A.

The conductor 61 is connected to a conductor 63 through a set of normally open contacts U-1 of the units relay. A resistor 64 is connected in parallel with the contacts U-1. The conductor 63 is connected to the conductor 62 and is also connected to a pair of normally open contacts ST-1 of a sequencing stop relay ST. A similar construction is used for the other matrix unit 36A, comprising the conductors 71, 72 and 73 corresponding to the conductors 61, 62 and 63 respectively; the hundreds relay contact H-1 and a resistor 74 are connected in the circuit in the same manner as the units relay contacts U-1 and the resistor 64. The conductor 73, however, is connected to a series of parallel sets of normally open contacts KP-2, OC1-1, OC2-1,

OC3-1, and I-1 of a plurality of sequencing relays KP, OC1, OC2, OC3, and I, respectively, described more fully hereinafter.

The relay contacts KP-2 are connected to the output conductor TKP of the tone generator TG10. The relay contacts OC1-1, OC2-1, and OC3-1 are each connected to one of the tone generator outputs T0 through T9; the three particular connections to be made depend upon the office code identification for the calling station. For example, if this identification constitutes the numerals 465, the contacts OC1-1, OC2-1, and OC3-1 are connected, respectively, to the tone generator outputs T4, T6 and T5. The contacts I-1, on the other hand, are connected to the line T0 constituting the output from the first tone generator TG0.

The conductor 61 (FIG. 2) is also connected, through a set of normally closed contacts KP-3 of the key pulse relay KP to a conductor 76 that constitutes a "floating return" or common line for all of the tone transformers in the tone generator unit 38. Similarly, the conductor 71 of the other half of the matrix is connected to the conductor 76 through a set of normally closed contacts TE-1 of the tens (TE) relay.

The conductor 76 is connected to a set of normally open pulse relay contacts P-1 and is also connected through a diode 77 to a set of normally closed contacts P-2 of the same relay. The coil of the pulse relay P that operates the contacts P-1 and P-2 is actuated by a relay KP and a relay TE. The other side of each of the contact pairs P-1 and P-2 is connected to a capacitor 78. The diode 77 is also connected to a set of normally open pulse relay contacts P-3, the contacts P-3 being connected to the opposite side of the capacitor 78 from the contacts P-2. An auxiliary power supply represented by a resistor 79 and a battery 80 is connected from the diode 77 to ground; the common terminal between the capacitor 78 and the relay contacts P-3 is returned to ground through a set of normally closed pulse relay contacts P-4.

Figure 8:
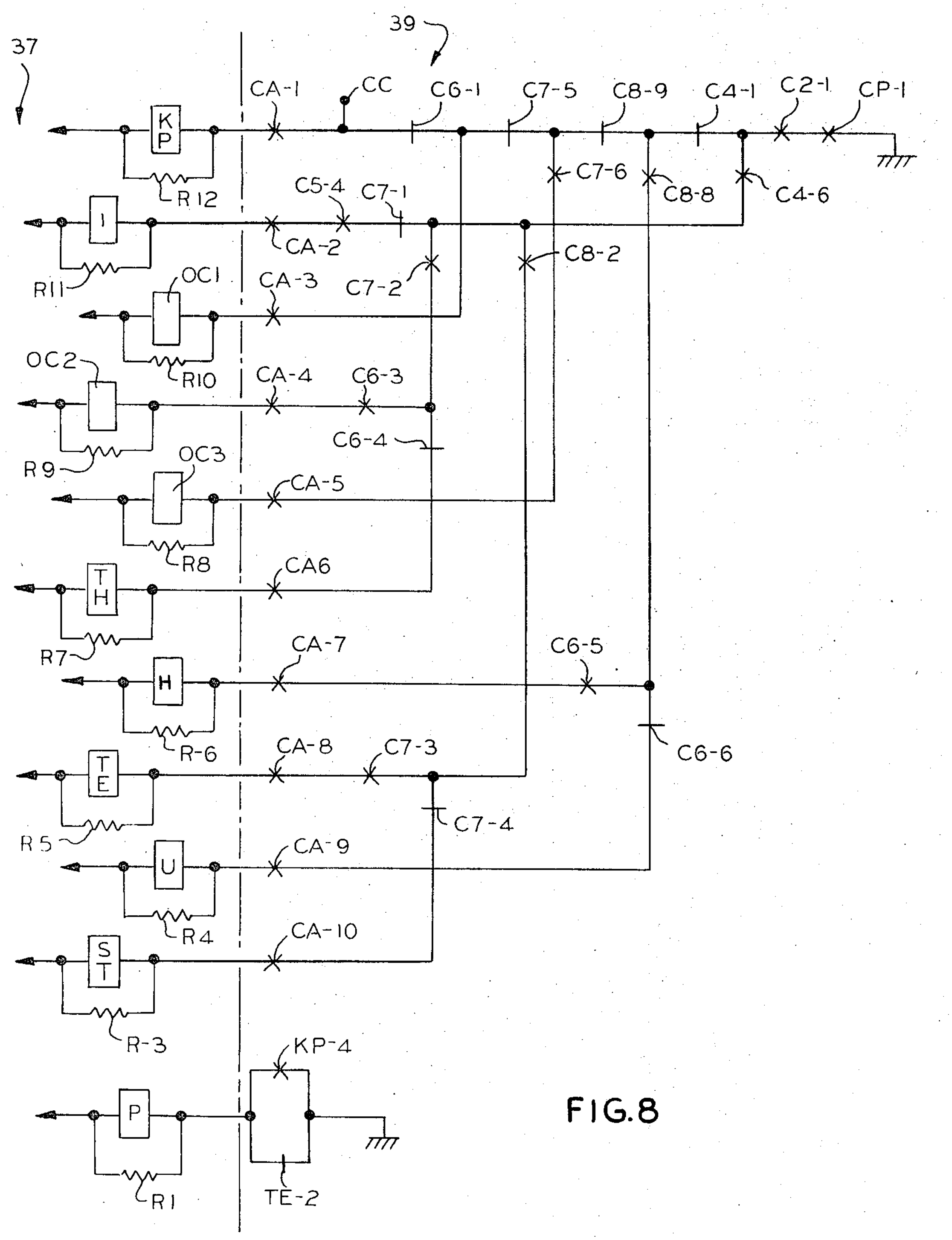
FIG. 8 is a circuit diagram of the operating circuits for the indentification sequencing relays of the identifier-sender of FIGS. 1 and 2.

A typical circuit arrangement for the energization of the identification sequencing relays KP, I, OC1, OC2, OC3, TH, H, TE, U, and St is illustrated in FIG. 8. It is believed that the circuit arrangement of FIG. 8 is essentially self-explanatory, the actuation of the sequencing relays being controlled by the contacts of a series of relays with the operating circuits for those relays being illustrated in FIG. 9, which is the main circuit diagram for the interrupter 39. The only further explanation required pertains to the actuation of the relay contacts CA1 through CA10. The CA relay, the coil for which is not illustrated in the drawings, is actuated by an appropriate circuit that maintains the CA relay continuously energized during the time the interrupter is assigned to operation of the identifier-sender 20. Thus, in normal operation, all of the contacts CA1 through CA-10 are maintained continuously closed.

Figure 9:
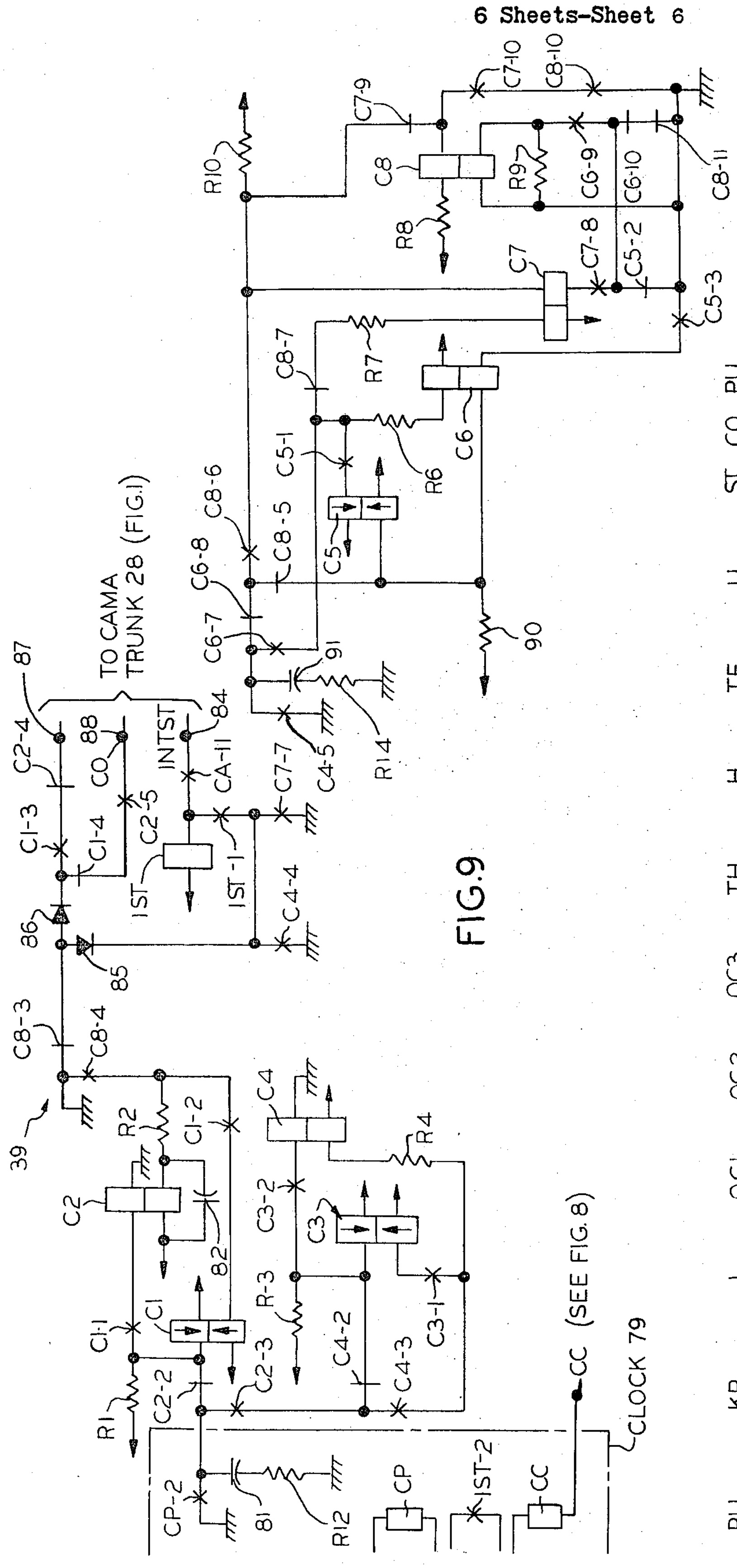
FIG. 9 is a circuit diagram of the operating circuits for the interrupter relays in the identifier-sender.

As shown in FIG. 9, each of the relays C1 through C8 of the interrupter 39 is a dual-coil control relay. C.P. Clare relays, types LA or LB, may be employed. One terminal of the first coil of the relay C1 is connected directly to the power supply. The other terminal of this coil of the relay C1 is connected to a resistor R1 that is returned to the power supply. The same coil terminal of the relay C1 is connected to system ground through a series circuit comprising a set of normally closed relay contacts CA-2 and a set of normally open contacts CP-2 of a clock pulse relay CP incorporated in a clock 79. The clock circuit 79 may be of conventional construction and hence is not shown in detail. The common terminal of the relay contacts C2-2 and CP-2 is also returned to system ground through the series combination of a capacitor 81 and a resistor R12. The second coil of the control relay C1 has one terminal connected to the power supply and the other terminal connected to system ground through the series combination of two sets of normally open control relay contacts C1-2 and C8-4.

One coil of the relay C2 is connected to the power supply through the series combination of the resistor R1 and a pair of normally open relay contacts C1-1. The other terminal of this coil is connected to system ground. The second coil of the relay C2 has one terminal connected to the power supply and the other terminal connected to system ground through the series combination of a resistor R2 and the relay contacts C8-4. A time delay capacitor 82 is connected in parallel with this coil of the relay C2.

One coil of the control relay C3 has a first terminal connected to the power supply and a second terminal that is returned to ground through the series combination of a pair of normally closed relay contacts C4-2, a pair of normally open relay contacts C2-3, and the contacts CP-2. This same terminal of the first coil for the relay C3 is also connected to the power supply through a resistor R3. The second coil of the relay C3 has one terminal connected to the power supply and the other terminal returned to ground through the series combination of the normally open relay contacts C3-1, the normally open relay contacts C4-3, and the contacts C2-3 and CP-2.

The first coil of the relay C4 has one terminal that is connected to system ground and a second terminal that is connected to the power supply through a series circuit including a set of normally open contacts C3-2 and the resistor R3. The other coil of this relay has one terminal connected directly to the power supply and a second terminal connected to system ground through a resistor R4 in series with the relay contacts C4-3, C2-3 and CP-2.

In the circuit arrangement for the interrupter 39 that is illustrated in FIG. 9, there is an interrupter start relay IST of single-coil construction, one terminal of the operating coil IST being connected to the power supply. The other terminal of the coil for the relay IST is connected to an interrupter start terminal 84 through a pair of normally open relay contacts CA-11 that, as explained above, are maintained closed during normal operation of the identifier-sender device. The terminal 84 is connected to each of the CAMA trunks 28 (FIG. 1), directly or through one of the applique circuits 31-33. This same terminal of the relay coil IST is returned to ground through the series combination of two sets of normally open relay contacts IST-1 and C7-7. The common terminal of the relay contacts IST-1 and C7-7 is connected to a set of normally open relay contacts C4-4 that are returned to system ground and is also connected through a diode 85 to a set of normally closed relay contacts C8-3 that are returned to system ground. Another set of normally open contacts IST-2 of the interrupter start relay are connected to the clock circuit 79 to control operation of the clock pulse relay CP.

A diode 86 is connected from the contacts C8-3 to a pick-up terminal 87 through the series combination of a set of normally open relay contacts C1-3 and a set of normally closed contacts C2-4. Terminal 87 is connected back to each of the CAMA trunks 28 (FIGS. 1 and 3), in this instance through trunk applique circuits 31—33. The diode 86 is also connected, through a set of normally closed relay contacts C1-4 and a set of normally open contacts C2-5 to a cut-off terminal 88 that also appears in FIG. 3.

One coil of the control relay C5 (FIG. 9) has one terminal connected to the power supply and the other terminal returned to ground through a circuit comprising, in series, the normally closed relay contacts C8-5, the normally closed contacts C6-8, and the normally open contacts C4-5. This same terminal of the C5 coil is connected to a resistor 90 that is returned to the power supply. The common terminal of the contacts C4-5 and C6-8 is connected to a capacitor 91 that is returned to system ground through a resistor R14. The other coil of control relay C5 has one terminal connected to the power supply and the other terminal returned to ground through a circuit comprising, in series, the normally open contacts C5-1, the normally open contacts C6-7, and the relay contacts C4-5.

A first coil for the control relay C6 has one terminal connected to the power supply and the other terminal connected to a resistor R6 that is returned to ground through the contacts C6-7 and C4-5. The other coil of this relay is connected to the resistor 90 and has its other terminal connected through a pair of normally open relay contacts C5-3 to system ground.

For control relay C7, one coil has a first terminal connected to the power supply and a second terminal connected to ground through a series circuit comprising a resistor R7, a pair of normally closed relay contacts C8-7 and the contacts C6-7 and C4-5. The other coil of the relay C7 has one terminal connected to the power supply through a resistor R10. The other terminal of this coil has a first ground return path that extends through a pair of normally open contacts C7-8 and a pair of normally closed contacts C5-2. An alternate ground return circuit for this second coil of relay C7 is provided through the contacts C7-8 and the series combination of two sets of normally closed relay contacts C6-10 and C8-11.

One coil of the control relay C8 in interrupter 39 (FIG. 9) is connected to the power supply through a resistor R8. The other terminal of this same coil is connected to the resistor R10 through a pair of normally closed relay contacts C7-9. The second terminal of the first coil for relay C8 is also connected to system ground through a series circuit comprising two sets of normally open relay contacts C7-10 and C8-10. A resistor R9 is connected across the terminals of the other coil for relay C8. One terminal of this resistor is connected directly to system ground and the other terminal is connected, through a pair of normally open relay contacts C6-9, to the common terminal between relay contacts C7-8 and C6-10

Figures 3, 4, 5, 6:
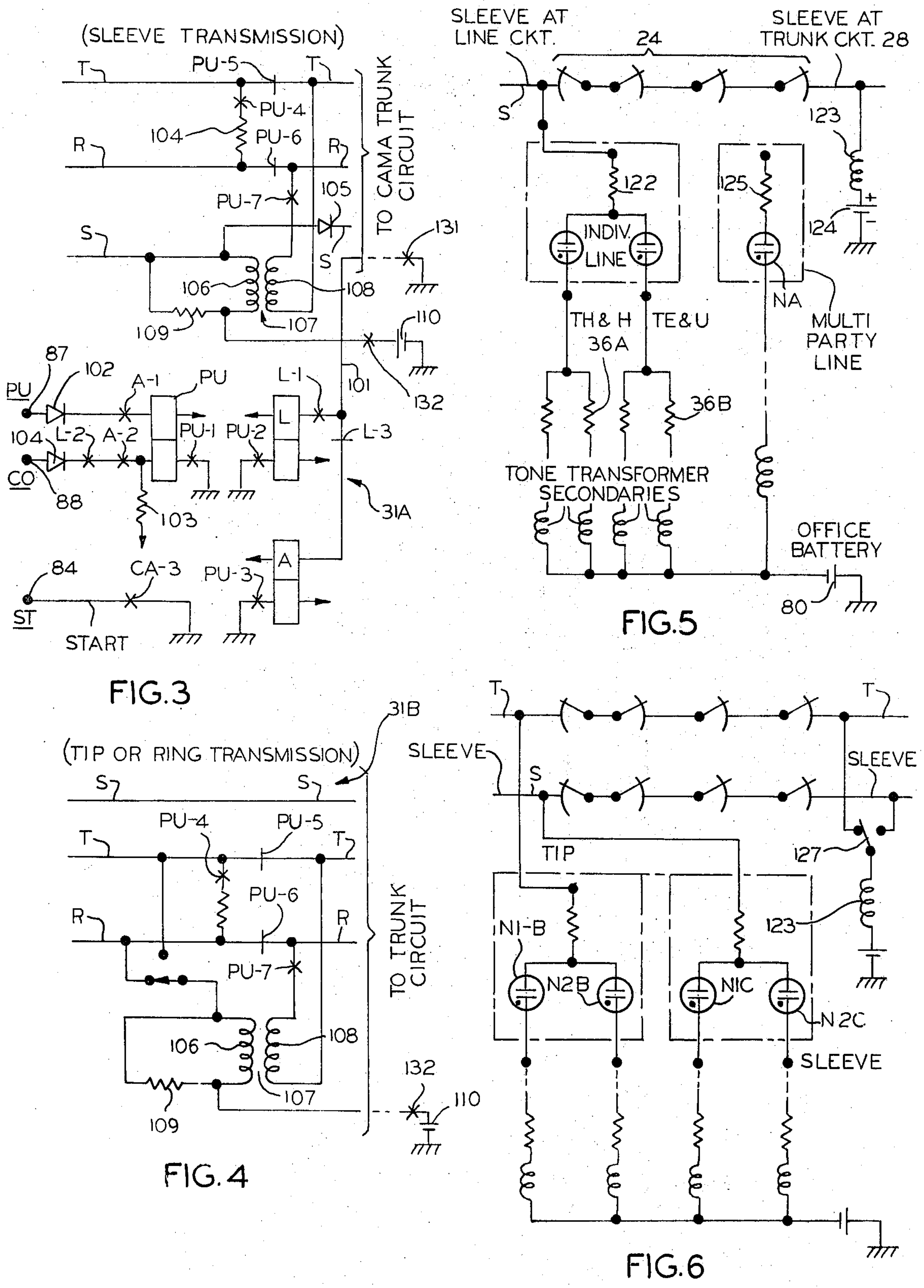
FIG. 3 is a circuit diagram of a trunk applique circuit for use in the identifier-sender of FIGS. 1 and 2 for sleeve transmission of ANI data.
FIG. 4 is a circuit diagram of a trunk applique circuit for tip or ring transmission of ANI data.
FIG. 5 illustrates a line identification cross-connect block circuit, for individual and multi-party lines, for the identifier-sender of FIGS. 1 and 2.
FIG. 6 illustrates another form of line identification cross-connect block circuit.

FIG. 3 illustrates one form of trunk applique circuit 31A that may be utilized for the circuits 31–33 (FIG. 1), and is arranged for transmission of identification information over the sleeve or control lead S of the CAMA trunk. The form of circuit 31A illustrated in FIG. 3 comprises a dual-coil Answer relay A; one coil is connected to a system power supply and to an actuating circuit, represented by a conductor 101, on which an off-hook signal is available from the called end of the trunk. The other coil of the relay A has one terminal connected to the power supply and the other terminal returned to ground through a pair of normally open relay contacts PU-3.

The trunk applique circuit 31A of FIG. 3 also includes a lock-out relay L having two operating coils. The first coil of the relay L has one terminal connected to the power supply and the other terminal connected to the conductor 101 through a pair of normally open contacts L-1. A pair of normally closed contacts L-3 of this relay are incorporated in series with the circuit from the conductor 101 to the relay coil A. The other coil of the lock-out relay L has one terminal connected to the power supply and the other terminal returned to system ground through a pair of normally open relay contacts PU-2.

A dual-coil pickup relay PU is incorporated in the trunk applique circuit 31A of FIG. 3. One of the two coils of the pickup relay is connected to the system power supply at one terminal. The other terminal of this coil is connected to the interrupter circuit terminal 87 (FIG. 9) through the series combination of a pair of normally open contacts A-1 and a diode 102 (FIG. 3). The second coil of the pickup relay PU has one terminal connected to system ground through a set of normally open relay contacts PU-1. The other terminal of this coil is connected to the power supply through a resistor 103 and is also connected to the interrupter circuit terminal 88 through a circuit comprising, in series, two sets of normally open relay contacts A-2 and L-2 and a diode 104. The interrupter circuit terminal 84 (see FIG. 9) also appears in FIG. 3, being connected to ground through a set of normally open relay contacts A-3.

In the circuit 31A of FIG. 3, a set of normally closed contacts PU-5 of the pickup relay are interposed in series with the tip conductor T of the trunk. The tip conductor is connected to the ring conductor R, at a point on the calling station side of the contacts PU-5, by a circuit comprising, in series, a set of normally open pickup relay contacts PU-4 and a resistor 104. In the ring conductor R, a set of normally closed pickup contacts PU-6 are connected in series with the conductor on the called-station side of the connection to the resistor 104.

The sleeve conductor S, in the circuit 31A as illustrated in FIG. 3, has a diode 105 connected in series therewith. On the calling-station side of the diode 105, the sleeve conductor S is connected to the primary winding 106 of a transformer 107, a resistor 109 being connected in parallel with the winding 106. The common terminal of the transformer winding 106 and the resistor 109 is connected to a battery or other power supply 110. The secondary winding 108 of the transformer 107 is connected across the tip and ring conductors T and R with a set of normally open pickup relay contacts PU-7 connected in series with the winding 108.

As noted above, circuit 31A of FIG. 3 is constructed for transmission of identification information over the sleeve conductor S of the CAMA trunk. FIG. 4 illustrates an alternate construction 31B for use in transmission of the identification information over either the tip conductor T or the ring conductor R. For circuit 31B, the circuits for the relays, A, L and PU would be the same as in FIG. 3 and hence have not been repeated in the drawing.

In the alternate construction 31B of FIG. 4, the primary winding 106 of the transformer 107 is connected to the ring conductor R. The resistor 104, in series with the pickup relay contacts PU-4, is connected across the tip and ring conductors. The relay contacts PU-5 and PU-6 are connected in series in the tip conductor T and the ring conductor R, respectively. The transformer secondary 108, again in series with the relay contacts PU-7, is in this instance connected across the conductors T and R; no circuit connection is required for the sleeve conductor S in this arrangement.

FIG. 5 illustrates a line identifaction cross-connect circuit 35A constituting the part of the block 35 (FIG. 1) employed to apply the identification information to the sleeve circuit of one calling station trunk, and is normally used in conjunction with the circuit 31A of FIG. 3. As shown therein, the sleeve conductor S, at the line circuit side, is connected to a terminal 121 which is connected through a resistor 122 to two neon switches N1 and N2.

In the sleeve transmission circuit of FIG. 5, the trunk circuit side of the sleeve is connected through a coil 123 to a booster battery or other power source 124 that is returned to system ground. FIG. 5 also includes an alternate construction that can be used for multi-party line situations, with the neon switching arrangement N1-N2 replaced by a neon switch NA connected to a resistor 125, which would then be connected to the sleeve terminal 121 instead of the illustrated connection to the resistor 122. With the multi-party line arrangement thus shown, only KP, I and ST digits would be transmitted, with operator control being required for the digits that actually identify a calling station.

FIG. 6 illustrates an alternate circuit 35B, to be used instead of that shown in FIG. 5, for a two party line arrangement using tip conductor and sleeve conductor transmission. In this instance, two neon switches N1B and N2B for the tip party of a two-party line are connected through a resistor 122B to the tip conductor of the calling station line. For the ring party, two neon switches N1C and N2C are connected through a resistor 122C to the sleeve conductor. In the arrangement of FIG. 6, the connection from the booster battery 124 and the coil 123 to either the tip or sleeve conductor comprises a set of relay contacts 127 controlled by an answer signal through the pickup lead and the pickup relay to apply the booster battery potential to the particular conductor that is to be used, depending on whether it is the tip party or the ring party which is to be identified.

Figure 7:
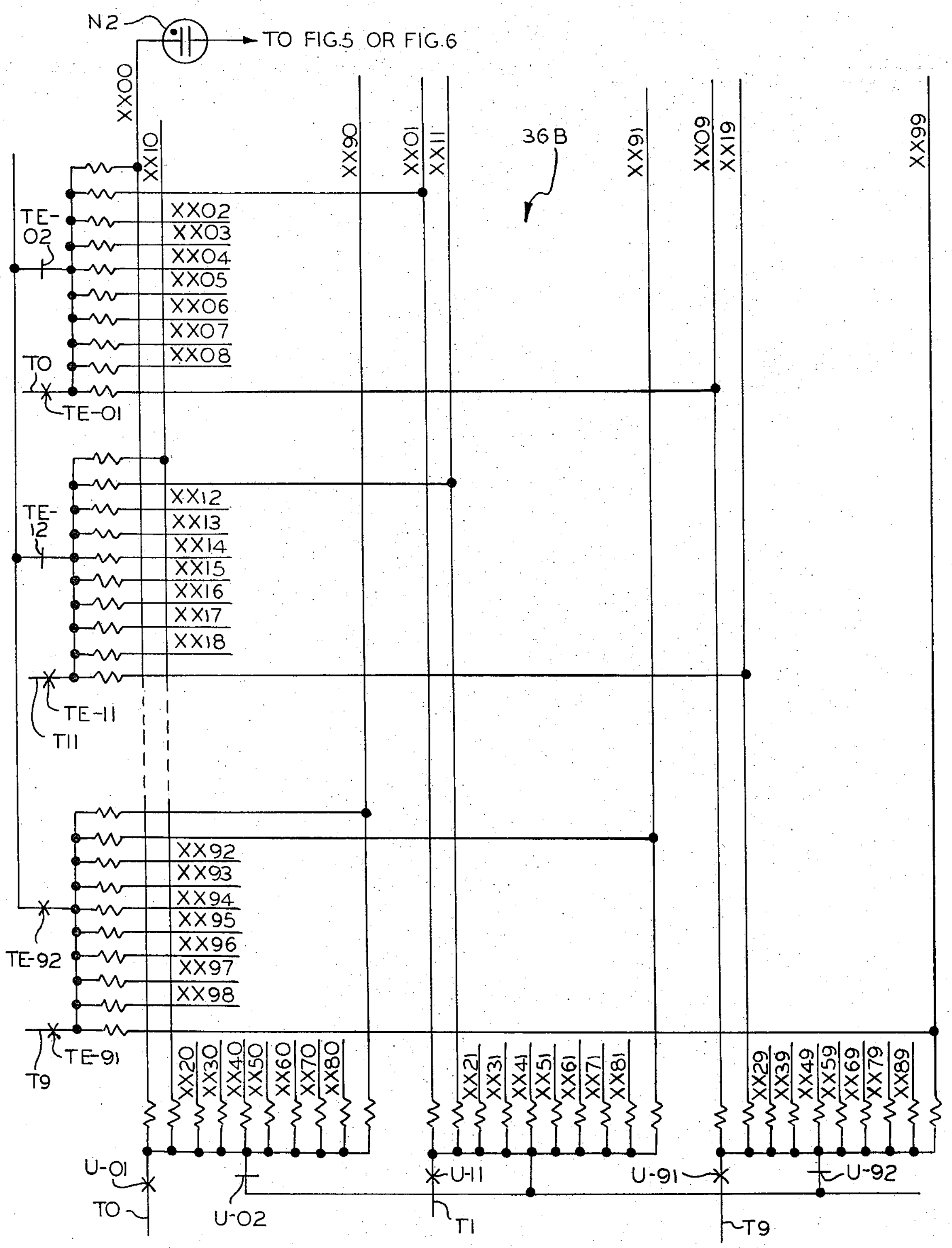
FIG. 7 illustrates the resistor matrix of FIGS. 1 and 2 in somewhat greater detail.
Figure 10:
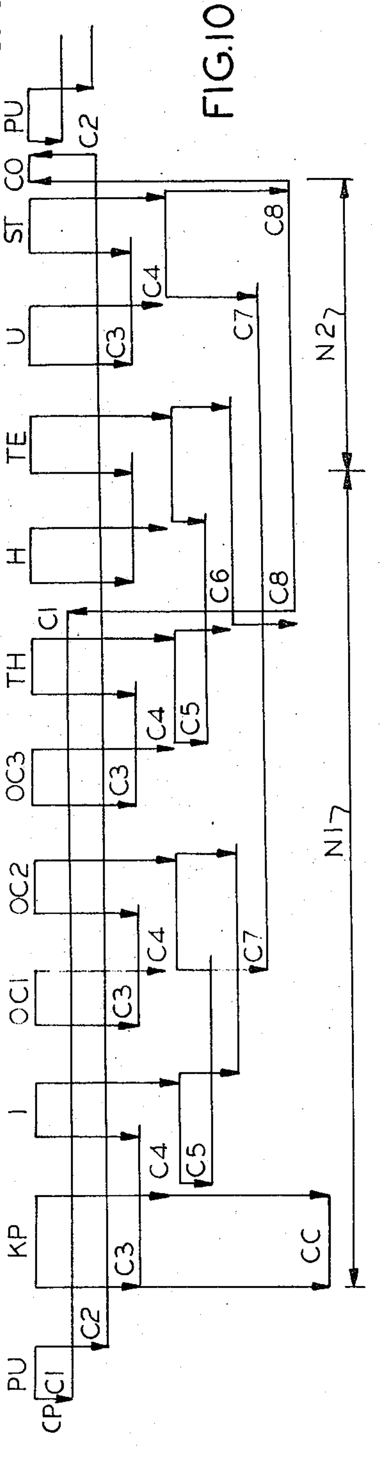
FIG. 10 is a timing chart illustrating the sequential operations of the relays of FIGS. 8 and 9.

As the identifier-sender 20 is depicted in FIGS. 2–10, each of the ten digits to be sent for a calling station identification is represented by a relay which operates in its proper order in the sending sequence; these are the sequencing relays of unit 37 (FIGS. 1, 2, 8). The coils for these ten relays are the coils KP, ST, OC1, OC2, OC3, I, TH, H, TE and U (FIG. 2). The sequence of operation is illustrated in FIG. 10. As each of these sequencing relays operates, it causes a dual-tone signal frequency from one of the tone generators TGO-TG11 to be connected to the line circuit for transmission, via the resistor matrix 36 and the neon switches N1 and N2 (FIGS. 5 or 6 and FIG. 7). The relays KP, I, OC1, OC2, OC3 and ST each connect only one fixed set of frequencies to the line because they represent the invariable digits of a calling station identification. The relays TH, H, TE and U, however, may each connect any of the 10 frequency combinations representative of digits from zero to nine. Each of the tens frequency sets (from the TE relay) is paired with all of the units sets (from the U relay) through the resistors in the tens-units matrix section 36B (FIGS. 2 and 7). There are two hundred tens-units resistors (100 pairs) and the center points of the resistor pairs (e.g., terminals 52 and 57) represent all tens-units combinations from 00 to 99. Similarly, there are one hundred possible thousands-hundreds combinations represented by the two hundred thousands-hundreds resistors in matrix section 36A and supplied with frequencies connected by the TH and H relays.

The thousands-hundreds combinations and the tens-units combinations are grouped together, as required, through the neon switches N1 and N2, to form whatever four-digit number combinations from 0000 to 9999 are needed to represent all of the station numbers equipped for ANI operation in the switching system to which the identifier 20 is attached.

In order to request an identification, a trunk must be arranged to start the interrupter 39, which operates the sequencing relays 37, and it must place a potential (positive with respect to ground) on the sleeve lead S toward the calling line circuit, assuming sleeve transmission is used. Together with operation of the Key Pulse relay KP, the Pulse relay P operates (FIGS. 2 and 8). This sequence places the previously-charged capacitor 78 in series with the central office battery, the battery 80 (FIG. 2), which is ordinarily a 50-volt source. The central office battery 80, together with the positive potential from the trunk circuit on the sleeve connection to the other side of the neon switch N1 (FIG. 5) is sufficient to fire the neon switch. After the capacitor 78 has discharged, the voltage from the office battery 80 conducted through the diode 77 in parallel with the capacitor 78, together with the positive potential from the trunk, is sufficient to sustain the neon switch N1 in an operated condition.

Through the path thus established through the neon swtich N1, the KP, I, OC1, OC2, and OC3 frequency codes are sent to the trunk where they are picked up from the sleeve lead and connected to an outgoing speech path. Frequencies representing the station code digits TH, H, TE and U, however, are applied through the resistors pairs in the matrix units 36A and 36B, one side of each resistor pair representing the digits being sent and the other representing the complementary digit of the pairs that remain connected to the common lead 76 connected to all of the tone transformers in the tone generators TGO-TG11. The complementary digit always remains connected to the lead 76 while its paired digit is being sent, to prevent currents from feeding back between digits otherwise combined in the resistor matrix.

A feedback that could also occur as a result of having combined a TH-H pair neon switch with a TE-U pair neon swtich is prevented by insuring that only the TH-H neon switch N1 is conducting during the TH-H cycle and that only the TE-U neon switch N2 is conducting during the T-U cycle. THis is accomplished by opening the path at the resistor matrix to the tone transformers common lead with break contacts of the TE or KP relays (contacts TE-1 and KP-3, FIG. 2) to extinguish the TH-H neon switch or, vice versa, the TE-U neon switch. This means also that the TE-U neon switch must be fired by activating the P relay sequence after the TH and H digits have been sent. And it is through the TE-U neon switch N2 that the fixed ST digit is sent to signal the end of an ANI transmission.

At times other than when a TH, H, TE or U digit signal is being sent, the break contacts of the TH, H, TE and U relays are connected through resistors 64 and 74 (one for the TE-U combination and another for the TH-H combination) to common leads 61, 62 and 71, 72, each connecting all of the tone transformer outputs TO-T9 and serving as a "return path." The resistors 64 and 74 permit KP, ST, I and OC tones to use the same neon lamps N1 and N2 as the terminal digits (TH, H, TE and U). The presence of these resistors 64 and 74, however, would permit a feedback during the transmission of the terminal digit tone signals, hence the provision of the make contacts U-1 and H-1.

The order in which sending takes place is therefore as follows:

A. The outgoing trunk requests an identification by completing a ground connection to the Answer relay A in circuit 31A to actuate the Answer relay and by placing a positive potential on the sleeve lead S, as by closing contacts 131 and 132 (FIG. 3). With the relay A actuated, the contacts A-3 are closed, affording an operating circuit for the interrupter start relay IST (FIG. 9) through the interrupter start terminal 84 (FIGS. 3 and 9).

B. The Clock Pulse relay CP is actuated by the closing of the contacts IST-2 to actuate clock 79 (FIG. 9). Thereafter, the contacts CP-2 open and close periodically; the usual clock period is 61 milliseconds for standard telephone practice. When the contacts CP-2 first close, an energizing circuit is completed for one coil of the control relay C1 (FIG. 9). The relay C1 is actuated, closing the contacts C1-3 to connect the terminal 87 to ground and complete an energizing circuit for the relay PU (FIG. 3) through the previously closed contacts A-1. Moreover, the contacts C1-1 are now closed (FIG. 9); the relay C2 is short circuited until the end of the clock pulse and then operates in series with relay C1.

C. With the pickup relay PU actuated, the lockup relay L is energized by closing of the contacts PU-2 (FIG. 3). The coontacts PU-3 are also closed, affording a holding circuit for the relay A. Moreover, the contacts PU-4 through PU-7 are all actuated, terminating the tip lead T and ring lead R at the resistor 104 (FIG. 3) and connecting the transformer winding 108 across the T and R leads.

D. Actuation of the lockup relay L establishes a holding circuit through its contacts L-1 and breaks the initial circuit to the relay A at the contacts L-3 (FIG. 3).

E. With the relay C2 now actuated, as described above, the KP relay is energized through the contacts C2-1 (FIG. 8). The contacts C2-3 close to energize the relay C3 on the next clock pulse. The initial energizing circuit to the pickup relay PU through terminal 87 (FIGS. 3 and 9) is opened at the contacts C2-4 but that relay is held energized through its second winding, contacts PU-1, and resistor 103 (FIG. 3).

F. When the KP relay is actuated, the contacts KP-4 close to actuate the pulse relay P (FIGS. 2 and 8). The relay P operates its contacts P01 through P-4 (FIG. 2) to connect the previously charged capacitor 78 in series with the office battery 80, causing the TH-H neon switch N1 (FIG. 5) to fire. Accordingly, the key pulse tones from the output TKP of the tone generator TG11 are supplied to the sleeve conductor S through the relay contacts KP-1 (FIG. 2) and the neon switch N1 (FIG. 5).

G. The sequence of relay operations now proceeds as illustrated in FIG. 10; the relays KP, I, OC1, OC2, and OC3 operate and release in succession, causing tone signals corresponding to these digits to be sent to the toll office 29 (FIG. 1) over the sleeve conductor. The clock pulse for the KP transmission is extended (see FIG. 10) by means of an auxiliary clock control relay CC (see FIGS. 8 and 9) in known manner to meet conventional telephone system standards. Subsequently, the thousands relay TH and the hundreds relay H operate and release in sequence to send the TH and H digits representative of the calling station (FIGS. 2 and 8).

H. The pulse relay P drops out when the KP relay releases (see FIG. 10) because the contacts KP-4 open at that time (FIG. 8). However, when the tens digit relay TE is operated, the pulse relay P is again energized by closing of the contacts TE-2. The neon switch N1 for the TH-H sequence is extinguished and the neon switch N2 for the TE-U-ST operation fires. THe sequence is completed by actuation of the TE relay to send the tens digit, operation of the U relay for transmission of the units value for the calling station, and, finally, transmission of the ST tones. ANI identification and transmission is now complete.

In the trunk circuit, off-hook supervision from the distant end, according to the signalling convention normally used for transmitting a calling number from an end office to a Centralized Automatic Message Accounting (CAMA) office, initiates the identification cycle. The interrupter start lead is grounded, as explained earlier, and positive potential is connected to the sleeve lead toward the line circuit, replacing ground to maintain a holding potential for the switch train relay and the line circuit cutoff relay. THe potential also provides the voltage which, when added to that provided by the identifier, is needed to fire and hold the neon switches N1 and N2.

The sleeve conductor S which carries the positive potential to the line circuit and identifier also provides a path for returning the digit frequencies from the identifier-sender 20 back to the trunk. Thus, as connected at the trunk cirucit to the source of positive potential 110, FIG. 3, the sleeve conductor passes through the primary winding 106 of the transformer 107, by which means the frequencies are induced into the secondary winding which is connected to the outgoing speech path at the trunk circuit. While the transformer is thus connected to the outgoing portion of the speech path, the speech path toward the line circuit is disconnected to prevent frequencies that might be picked up from the station from falsely being received at a distant office and causing an incorrect calling number to be recorded.

After ANI sending has been completed, the speech path is restored and the secondary winding 108 of the transformer is disconnected by release of the relay PU. As described above, the relay PU operates from the interrupter at the start of the ANI sending cycle and releases at the end. The relay L locks to the operated, called-end supervisory relay, represented by the contacts 131 (FIG. 3). The relay L, if released and reoperated from the called end, will cause identification of the calling number to be re-initiated.

A variation of the trunk operation described above may be used within a central office to trace numbers locally or to otherwise record a calling number at a device located within a short distance of the switching equipment. If the sleeve conductor is extended from a trunk circuit to the location where the calling number is to be recorded, the positive potential can be applied there and the frequencies received and detected there via this extended sleeve conductor instead of using the tip and ring speech conductors as described for trunk operation.

Two variations of the path conducting technique may be employed if there is a discontinuity in the sleeve path from the line circuit through the switch system 24 FIG. 1) to the outgoing trunk. In switching systems where stations are rung on the ring side of the line with the tip side grounded, the tip side may be used for identification purposes instead of the sleeve. Similarly, if the ring side is grounded and the tip used for ringing, the ring conductor may be used for the identification path. These variations are illustrated in FIG. 4. By using the side of the line that is grounded during ringing as the identification conductor, false actuation of the neon switches N1 and N2 by ringing currents is avoided.

Included as part of the invention, and derived from the technique described for using alternative conductors, is an arrangement for two-party line identification (see FIG. 6). The outging trunk circuit can be arranged to test the line toward the calling station to determine which of the two parties on the line is making the call. This test can be effected by equipping the trunk with circuitry similar to that normally used in existing identification equipment and well understood to those familiar with the art. To summarize the operation of this circuitry, a test is made to determine whether (A) a resistance ground is present interdigitally and conditioned by the stations being off-hook, or, (B), whether a resistance ground can be detected duringpulsing, i.e., conditioned by the station dial being off-normal.

In either of these cases, which represent techniques currently utilized in equipment of different manufacturers, presence of a ground indicates that one party on a two-party line is making the call and absence of the ground signifies that the other party is making the call. Nevertheless, the designation of the party calling is appropriately registered within the trunk, and when the signal arrives from the called end requesting the calling number's identity, the trunk circuit places a positive potential toward the line circuit, either on the tip or ring conductor or on the sleeve conductor. The number received at the trunk circuit is received on either one or the other of the conductors, whichever was connected to positive potential following the party test operation. Each number, signifying a different party on the line, is connected to one or the other conductor via a neon switch at the line circuit (switches N1A, N2A and N1B, N2B, FIG. 6) in the same way that a number is connected for individual line identification.

The preferred form of the invention utilizes earth ground as a return path for frequencies sent to a trunk over the sleeve conductor. When the tip or ring conductor is used, a separate return conductor may be utilized which is isolated from ground and common to all outgoing trunks provided with the identification feature. With this arrangement, distinguishing the side of the line used for ringing is unnecessary because the operating circuit of the neon switch (e.g., N1 or N2, FIg. 3) is not the same as the return path (ground) of the ringing machine. However, a battery other than the office battery, which is connected to ground, should be provided to sustain the "on" condition of neon switches in series with the positive potential provided from the trunk circuit.

The invention may also be implemented with another type of signal generators (e.g., a digital code pulser or a dial pulse sender) to replace the two-frequency generators that produce MF coded pulses signifying the various digits.

Other devices may be substituted for the neon switches to provide a similar function of connecting digit transmissions from frequency generators or pulse producing devices to a conductor associated with the line circuit. The replacement devices should be responsive to some signal originating at the outgoing trunk circuit or arriving via the outgoing trunk from a distant point.

Similarly, the interrupter 39 may be constructed as a solid state counter rather than using the electromechanical relays shown in the specific embodiment of FIG. 9. Moreover, the resistor pairs of the matrix 36 (FIG. 7) may be replaced by a different form of gate that can perform the same function.

Receiving apparatus to form a complete system with the identifier sender described above may consist of detection and recording equipment well known and understood as "AMA offfice," "ticketing office," or "automatic toll recording" equipment. In addition, the invention may be used with equipment especially designed to provide "calling number identity" service to individual customers, either at the central office served by the identifier or located at distant offices. Individual users of the service must be provided with equipment that is arranged to signal the identifier remotely, either via a third conductor extended from the sleeve lead or by causing an answer condition (off-hook) to be returned to the outgoing trunk.

When the individual user of the calling number identification service is connected to a central office other than that serving the calling number to be identified, two different arrangements may be utilized for instructing the outgoing trunk circuit to request the identification. If the trunk between the two offices is not normally used to transmit ANI information to a toll recording office, the outgoing trunk circuit may be arranged to respond to an off-hook signal from the distant end to activate a number identification cycle. But if the trunk is normally an ANI trunk, an individual customer for this service cannot also make use of an off-hook signal to activate the feature. The reason for this is that outgoing trunks at end offices that provide ANI to recording offices are locked to the off-hook signal they receive from the recording office when the calling number is requested. These trunks then become incapable of recognizing subsequent off-hook conditions, including those created by the called station answering. To overcome this difficulty, such outgoing trunks may be additionally equipped with a detector to recognize an analog tone or a digitally encoded signal transmitted by the distant, individual user. This signal causes the trunk to request calling number identification after the normal off-hook signal has already been received from the recording office and the calling number has been sent once for billing purposes.

This invention is therefore intended to cover systems using the identifier in combination with an outgoing trunk circuit capable of requesting calling number identification when signalled by means of an off-hook signal as well as when signalled by means of a tone or digitally encoded signal (both capabilities being part of the same physical trunk circuit). This same trunk will also be able to condition the calling number as received via one of the conductors switched through from the line circuit and to connect it to the outgoing speech path as described earlier.

There are numerous variations on the applications in which the identifier-sender 20 can be employed. Thus, the device 20 may be used, with suitable interconnect equipment, for artificial traffic generation when making traffic capability tests of a telephone system. The interconnect equipment would consist of means for cross-connecting a plurality of call-originating circuits to the line identification matrix equipment 35, 36 so that each originating circuit would generate a call to a different test number. Included in the originating circuit would be means for detecting a start-dialing signal from the telephone switchboard, means for extending the tone signals from the sequencing circuit 37 to the telephone switchboard as control signals to establish a connection to a test number, and means for releasing the connection and restarting a call when the test number is reached.

With a suitable interconnect circuit, the device 20 of Box 20, may also be used to provide centrally located Call Forwarding Service to a plurality of subscribing stations. Each subscribing station would be capable of selecting one of a group of pre-selected alternate stations to which its calls would be extended when the prime station is unattended. The interconnect circuit would include means for selecting the alternate station and activating the transfer function, means for detecting a call to the prime station while in the transfer mode, means for originating a call for service to the telephone switching system and detecting a start dialing signal, and means for extending the tone signals from the sequencing circuit to the switching system as control signals for establishing a connection to the preselected alternate station. After such a connection is established, the interconnect equipment would extend the call waiting at the prime station through a second switch path to the alternate station.

Of course, the identifier-sender of the present invention is not confined to the specific applications discussed above, nor is it limited to the transmission of the particular sequence of digits (I+KP_OC1—3+station digits +ST) set forth in the detailed example. For special applications, the number and nature of the set of identification signals transmitted can be adjusted and varied to suit virtually any required circumstance. Thus, by addition of further digits in the identification sequence, the calling station can be identified as entitled to (or denied from) calling access to particular called stations, as being scheduled for special routing (i.e., coin stations or emergency lines), or any number of other special treatments.

I claim:

1. In a telephone system or like communication system of the kind comprising a plurality of calling stations each connectable to a plurality of called stations through a series of trunk circuits each including a data path and a control path, a combined calling number identifier and sender capable of simultaneous identification of a multiplicity of calling station numbers and able to send the identity of those numbers out over a plurality of trunk making concurrent requests, the identifier-sender comprising:

signal-actuated identity transmitting means for transmitting the identity of a calling station, as a sequence of signals, through a first switched conductor incorporated in a path from a line circuit to an outgoing trunk extending to a called station;

actuating means for applying an actuating signal from the trunk to the transmitting means, over a switched conductor, requesting identification of the calling number;

and interrupter means for effectively disconnecting the data path between the calling station and the transmitting means, to preclude data transmission during operation of the transmitting means.

2. A calling station identifier-sender for a communication system, as set forth in claim 1, in which the transmitting means includes a plurality of identification signal sources, an encoding matrix coupled to the identification signal sources, and sequencing means for connecting the first switched conductor through the encoding matrix to selected ones of the signal sources, in predetermined sequence, in each transmission operation.

3. A calling station identifier-sender for a communication system, as set forth in claim 2, in which each calling station line circuit is connected to the encoding matrix through identification switching means individual to that circuit, and in which the sequencing means is actuated in a fixed time sequence for each transmission operation.

4. A calling station identifier-sender for a communication system, as set forth in claim 3, in which the first switched conductor constitutes a part of the control path of a trunk circuit, and in which the same switched conductor is utilized for the actuating signal.

5. A calling station identifier-sender for a communication system, as set forth in claim 3, in which the first switch conductor constitutes a part of the data path of a trunk circuit, and in which the switched conductor utilized for the actuating signal is a part of the control path of the trunk circuit.

6. A calling station identifier-sender for a communication system, as set forth in claim 3, in which the identity of a calling station on a party line is determined by separate switched conductors in the trunk circuit extended from the line circuit for that calling station.

7. A calling station identifier-sender for a communication system, as set forth in claim 3, in which the identification switching means comprises a voltage-sensitive switching device isolating the encoding matrix from the first switched conductor until a high voltage is applied to that conductor.

8. A calling station identifier-sender for a communication system, as set forth in claim 7, in which the switching device is a cold cathode gas discharge tube.

9. A calling station identifier-sender for a communication system, as set forth in claim 1, in which the transmitting means includes an isolating transformer, coupled to the first conductor, for applying the sequence of identifying signals thereto.

* * * * *